(12) United States Patent
Yokota

(10) Patent No.: US 6,968,510 B2
(45) Date of Patent: Nov. 22, 2005

(54) FUNCTION EXECUTING APPARATUS AND MENU ITEM DISPLAYING METHOD THEREFOR

(75) Inventor: Tatsuo Yokota, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 546 days.

(21) Appl. No.: 09/777,361

(22) Filed: Feb. 5, 2001

(65) Prior Publication Data

US 2002/0105549 A1 Aug. 8, 2002

(51) Int. Cl.$^7$ .......................................... G06F 17/30
(52) U.S. Cl. ..................... 715/824; 715/805
(58) Field of Search .................. 345/821, 823, 345/824, 851–854, 765, 767, 802, 803, 804, 345/794–797, 811, 814, 828–830, 745; 710/10; 715/805, 807, 712, 802, 771, 821–824, 855, 715/859–860, 825, 968; 701/213, 27, 202; 707/102

(56) References Cited

U.S. PATENT DOCUMENTS

| | | | | |
|---|---|---|---|---|
| 5,608,635 A | * | 3/1997 | Tamai | 701/209 |
| 5,784,059 A | | 7/1998 | Morimoto et al. | |
| 5,790,810 A | * | 8/1998 | Kaba | 710/104 |
| 5,832,408 A | | 11/1998 | Tamai et al. | |
| 5,845,226 A | * | 12/1998 | Ajima | 701/208 |
| 6,092,076 A | * | 7/2000 | McDonough et al. | 707/102 |
| 6,161,151 A | * | 12/2000 | Sudhakaran et al. | 710/10 |
| 6,182,171 B1 | * | 1/2001 | Akatsuka et al. | 710/100 |
| 6,331,867 B1 | * | 12/2001 | Eberhard et al. | 345/864 |
| 6,366,301 B1 | * | 4/2002 | Thomas et al. | 715/771 |
| 6,385,535 B2 | * | 5/2002 | Ohishi et al. | 701/209 |
| 6,496,205 B1 | * | 12/2002 | White et al. | 345/824 |
| 6,496,940 B1 | * | 12/2002 | Horst et al. | 714/4 |
| 6,510,379 B1 | * | 1/2003 | Hasegawa et al. | 701/202 |
| 6,580,440 B1 | * | 6/2003 | Wagner et al. | 345/762 |
| 6,606,465 B2 | * | 8/2003 | Mutoh et al. | 399/81 |
| 6,611,755 B1 | * | 8/2003 | Coffee et al. | 701/213 |
| 6,640,185 B2 | * | 10/2003 | Yokota et al. | 701/208 |
| 6,653,948 B1 | * | 11/2003 | Kunimatsu et al. | 340/995.19 |
| 6,693,564 B2 | * | 2/2004 | Niitsuma | 340/995.2 |
| 6,754,485 B1 | * | 6/2004 | Obradovich et al. | 455/414.1 |
| 6,769,320 B1 | * | 8/2004 | Bollgohn et al. | 73/866.3 |

* cited by examiner

Primary Examiner—Steven Sax
(74) Attorney, Agent, or Firm—Brinks Hofer Gilson & Lione

(57) ABSTRACT

In an apparatus, menu items are displayed on a screen, and when a predetermined menu item is selected, a function corresponding to the selected menu item is executed. The menu item displaying method comprises the steps of determining whether a function corresponding to a menu item displayed on the screen can be executed, and when it is determined that the function cannot be executed, disabling the menu item corresponding to the function from being selected and displaying a reason why the menu item cannot be selected.

11 Claims, 15 Drawing Sheets

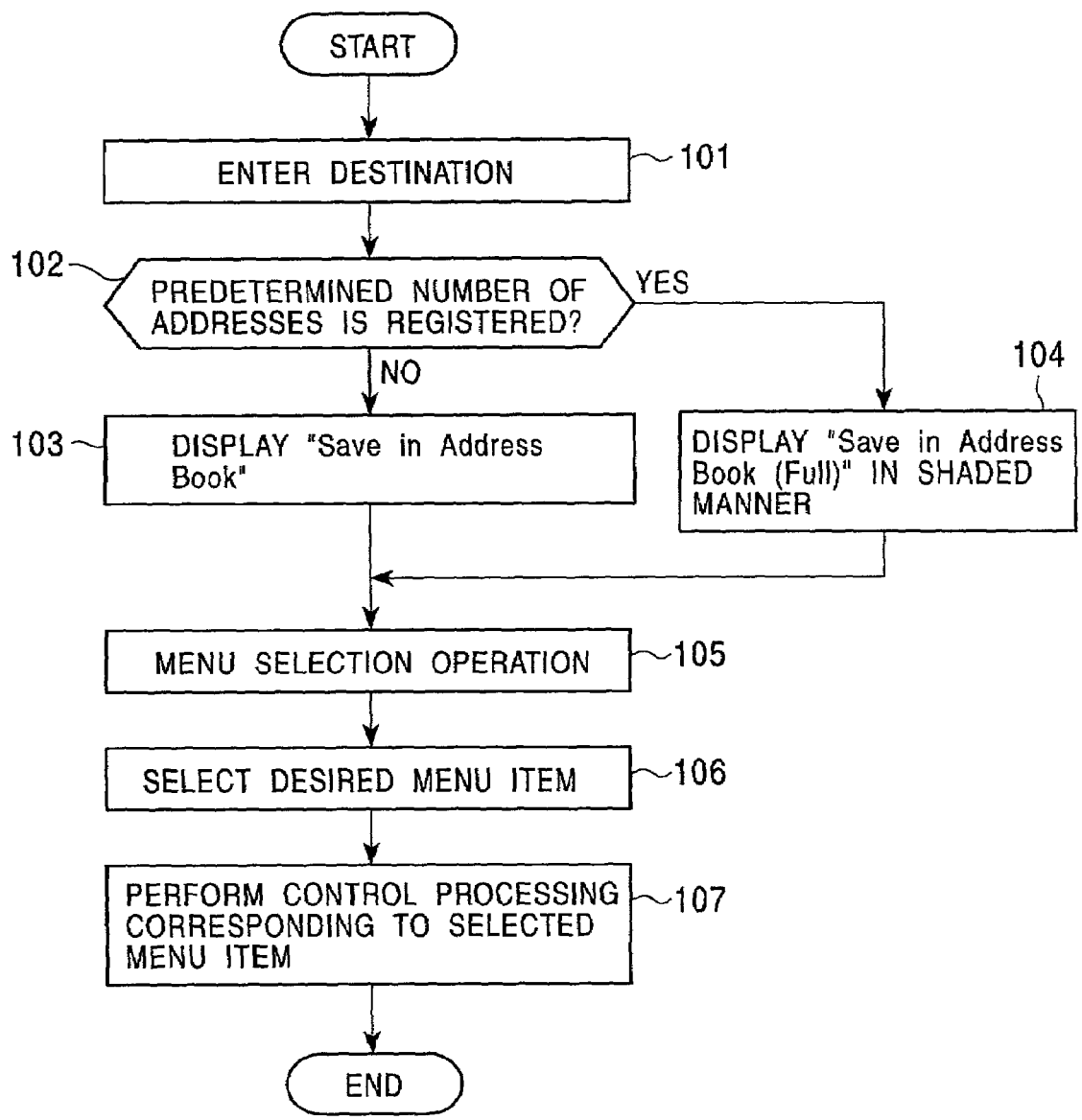

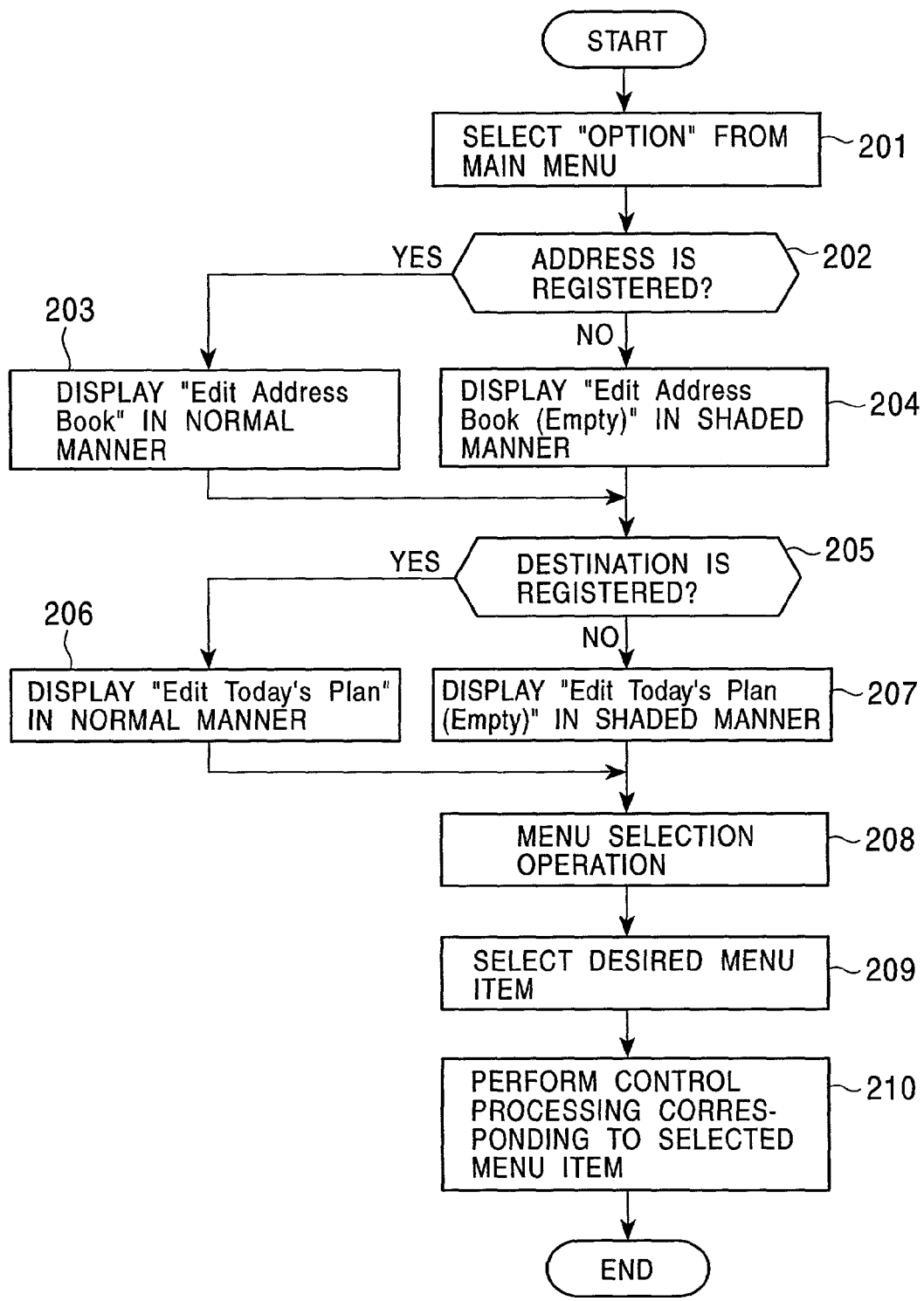

FUNCTION EXECUTING APPARATUS AND MENU ITEM DISPLAYING METHOD THEREFOR

BACKGROUND OF THE INVENTION

1. Field of the Invention

The present invention relates to function executing apparatuses and menu item display methods therefor, and particularly relates to a function executing apparatus and a menu item display method therefor for executing a function corresponding to a selected menu item when menu items are displayed on a screen and a predetermined menu item is selected.

2. Description of the Related Art

A navigation apparatus mounted in a vehicle is provided with a "MAP GUIDANCE MODE" and an "ARROW GUIDANCE MODE". Based on the selected mode, route guidance to a destination is performed. In the "MAP GUIDANCE MODE", a map image and a route are drawn on a display screen with a vehicle position mark superimposed thereon at a predetermined position thereof. As the current location of the vehicle changes when the vehicle travels, the vehicle position mark is caused to move along the route. Alternatively, the map image is scrolled while the vehicle position mark remains fixed at a predetermined position. Therefore, a detailed map image for the vicinity of the vehicle is displayed so as to be understood at a glance. In the "ARROW GUIDANCE MODE", the route as well as the roads intersecting therewith are schematically shown along with an arrow representing the direction of travel at an intersection. In addition, the distance to the intersection, the direction of the destination, the distance to the destination and the like are shown. Furthermore, the direction of travel at the intersection is guided by a synthesized voice.

In order to be guided along the route using the "MAP GUIDANCE MODE" or the "ARROW GUIDANCE MODE", the name of the destination must be input to find the route to the destination. The following input methods are known:

(1) a method of directly inputting the address of the destination;

(2) a method of inputting a desired intersection by specifying two streets when the destination is the intersection;

(3) a method of inputting the place name of a POI (Point of Interest) which is the destination;

(4) a method of initially inputting a POI place type (category) of the destination and then selecting the place name of the destination from a list of possible "place names" corresponding to the selected POI place type;

(5) a method of selecting the name of the destination from among the names of a number (n) of recent destinations;

(6) a method of selecting the name of the destination from among the names of POIs pre-registered in an "address book";

(7) a method of inputting the destination by directly pointing to the position of the destination on the map image using a cursor;

(8) a method of inputting a telephone number of the POI which is the destination; or the like.

In order to input the destination using method (6), a user presses a menu button of a remote control unit to display a main menu on a screen (see FIG. 10A). When the user selects a menu item "Dest" from the main menu, the navigation apparatus displays a "Find Destination by" screen for specifying a destination input method (see FIG. 10B). When a menu item "Address Book" 31 is selected, the navigation apparatus displays the names of the addresses registered in an address book in a scrollable manner (see FIG. 10C). By selecting the name of a desired address (for example, ALPINE), the selected address and the name thereof are displayed as shown in a "Confirm Destination" screen in FIG. 10D. After confirming what is displayed on the screen, the user selects "OK to Proceed" on the "Confirm Destination" screen to set the selected address as the destination. The navigation apparatus finds a route from the current location of the vehicle to the destination and displays it.

The addresses registered in the address book are those which are likely to be set again as destinations in the future. A registration method to do this is as follows. A destination is input using one of the above input methods (1) to (8). When the destination is input, the system displays the "Confirm Destination" screen (see FIG. 11A). In order to register the destination in the address book, the user selects a menu item "Save in Address Book" 51. The system displays an "Input Name" screen (see FIG. 11B). When, as shown in FIG. 11C, the user inputs an address name ("MY FAVORITE BURGER") using a keyboard displayed on the screen and selects a menu item "Save" 32, the system displays the input address name (MY FAVORITE BURGER) and the corresponding address on the "Confirm Destination" screen (see FIG. 11D).

In addition, the navigation apparatus is provided with a "Today's Plan" function. The "Today's plan" function is as follows. The user inputs, to a today's plan list, up to eight destinations to which the user plans to go on the present day. The system finds the route which traverses the input destinations in such an order as to minimize the total distance traveled. Then, the user is guided along the found route. A method for adding a destination to the today's plan list is as follows. The user inputs a destination using one of the above input methods (1) to (8) and then the system displays the "Confirm Destination" screen (see FIG. 12A). When the user selects a menu item "Add to Today's Plan" 41, the system adds the input destination to the today's plan list and displays a "Today's Plan List" screen, as shown in FIG. 12B. In order to find the route (the shortest path) which goes through all destinations registered in the today's plan list, the user presses the menu button of the remote control unit to display the main menu (FIG. 10A) and selects the menu item "Dest" from it. As shown in FIG. 13A, the system displays the "Find Destination by" screen for specifying the destination input method. When the user selects a menu item "Today's Plan" 42 from the screen, the system displays a "Calculating" message, as shown in FIG. 13B. In the meantime, the system finds the route which goes through the destinations registered in the today's plan list and displays the route to the first destination on the map image.

When it is desired to delete or change an address or a destination which is registered in the address book or the today's plan list in the above-described manner, the following process is performed.

In order to change or delete an address name registered in the address book, the user presses the menu button of the remote control unit to display the main menu on the screen (see FIG. 14A). When the user selects a menu item "Option" from the menu, the system displays a "Select" screen for specifying an object to be edited, as shown in FIG. 14B. When the user selects a menu item "Edit Address Book" 60 from the "Select" screen, the system displays a "Select Name" screen, as shown in FIG. 14C. In the "Select Name" screen, the system displays the address names registered in the address book in a scrollable manner. By selecting an address name (for example, "GREAT WESTERN BANK") to be changed or to be deleted from this "Select Name" screen using a cursor or a menu bar (highlighted region) and pressing an enter key, a "Confirm Address" screen is displayed, as shown in FIG. 14D. In order to change the selected address name or a registered telephone number corresponding to the selected address name, the user selects a menu item "Change Name & Phone Number" from the "Confirm Address" screen. On the other hand, in order to delete the address corresponding to the selected address name, the user selects a menu item "Delete from Address Book".

For example, the address name is desired to be changed from "GREAT WESTERN BANK" to "MOM'S BANK". The user selects the menu item "Change Name & Phone Number" from the "Confirm Address" screen. As shown in FIG. 14E, the system displays the "Input Name" screen, so that the user inputs the selected address name using the displayed keyboard and then selects the menu item "Save" from the "Input Name" screen (see FIG. 14F). Thus, the system changes the address name from "GREAT WESTERN BANK" to "MOM'S BANK".

In order to delete a destination registered in the today's plan list, the user presses the menu button of the remote control unit to display the main menu on the screen (see FIG. 15A). When the user selects the menu item "Option" from the main menu, the system displays, as shown in FIG. 15B, the "Select" screen for specifying an object to be edited. The user selects a menu item "Edit Today's Plan" 62 from the "Select" screen and the system displays a "Select Address" screen, as shown in FIG. 15C. In the "Select Address" screen, the system displays the names of the destinations registered in the today's plan list in a scrollable manner. By selecting an address name (for example, "WORLD TRADE CENTER") to be deleted from the "Select Address" screen and pressing the enter key, the "Confirm Address" screen is displayed as shown in FIG. 15D. After confirming the destination name displayed on the "Confirm Address" screen, the user selects a menu item "Delete from Today's Plan" to delete the selected destination from the today's plan list.

As described above, according to the "Address Book" function, when some location is set as the destination and it is determined that it may be set as the destination again in the future, the location is registered in the address book. This allows the destination to be set by retrieving this location from the address book when the destination is to be newly set. According to the "Today's Plan" function, the shortest path which goes through all set destinations can be found.

In view of memory limitations, no more than n addresses (for example, n=90 addresses) can be registered. Therefore, when it is attempted to register another address in the address book and 90 addresses are already registered therein, the menu item "Save in Address Book" 51 is shaded with gray, or the background color and the foreground color of the menu item 51 are reversed, so that additional registration cannot be performed. For example, when the background color and the foreground color are reversed, as shown in FIG. 16A (i.e., the background color and the foreground color of the menu item "Save in Address Book" 51 are black and white, respectively) it is easy to distinguish this menu item 51 from the other menu items. When the menu item 51 is displayed in a shaded manner, even though the user attempts to select this menu item 51, the cursor is caused to skip over it so that it cannot be selected.

Editing as described in FIGS. 14A to 14F must be performed in order to change or delete an address registered in the address book. However, when no address is registered in the address book, change or deletion cannot be performed thereon. Accordingly, in order to avoid editing the address book, the menu item "Edit Address Book" 60 is shaded with gray, or the background color and the foreground color of the menu item 60 are reversed on the "Select" screen (FIG. 14B) which is displayed when the address book is to be edited. For example, as shown in FIG. 16B, by setting the background color and the foreground color of the menu item "Edit Address Book" 60 to black and white, respectively, the other menu items having the background color white and the foreground color black are distinguished from the menu item "Edit Address Book" 60. The cursor is caused to skip over this menu item 60 so that it cannot be selected.

Editing as described in FIGS. 15A to 15D must be performed in order to delete a destination registered in the today's plan list. However, when no destination is registered in the today's plan list, change or deletion cannot be performed. Accordingly, in order to avoid editing the today's plan list, the menu item "Edit Today's Plan" 62 is shaded with gray, or the background color and the foreground color of the menu item 62 are reversed on the "Select" screen (FIG. 15B) which is displayed on the screen when the today's plan list is to be edited. For example, as shown in FIG. 16C, by setting the background color and the foreground color of the menu item "Edit Today's Plan" 62 to black and white, respectively, the other menu items having the background color white and the foreground color black are distinguished from the menu item "Edit Today's Plan" 62. In addition, the cursor is caused to skip over this menu item 62 so that it cannot be selected.

When no destination is registered in the today's plan list, the menu item "Today's Plan" 42 is shaded on the "Find Destination by" screen shown in FIG. 13A. In addition, the cursor is caused to skip over this menu item 42 so that it cannot be selected.

As described above, when a predetermined number of addresses is already registered in the address book, no further address can be registered therein. When no address is registered therein, editing cannot be performed. Likewise, when a predetermined number of destinations is already registered in the today's plan list, no further address can be registered therein. When no destination is registered therein, editing cannot be preformed. When registration or editing which has been normally performed suddenly cannot be performed, the user is confused and tends to think that the navigation apparatus has broken. In particular, when the user attempts to select a shaded menu item, since the shaded menu item cannot be selected, the user does not understand why, assumes that some trouble has occurred, and complains to the customer support center of the manufacturer. This causes considerable labor and expense to the manufacturer to deal with such user complaints.

SUMMARY OF THE INVENTION

Accordingly, an object of the present invention is to cause a user to recognize a reason why, when a certain function cannot be executed, a menu item corresponding to this function cannot be selected.

Another object of the present invention is to cause the user to recognize a reason why, when a predetermined function cannot be executed due to registration of a predetermined amount of data, no data being registered, or a currently set predetermined mode, a menu item corresponding to this function cannot be selected.

Still another object of the present invention is to cause the user to recognize, using simple words, a reason why a menu item corresponding to a function which cannot be executed cannot be selected.

To this end, according to a first aspect of the present invention, there is provided a menu item displaying method of an apparatus in which menu items are displayed on a screen and when a predetermined menu item is selected, a function corresponding to the selected menu item is executed. The menu item displaying method includes the steps of determining whether a function corresponding to a menu item displayed on the screen can be executed, and when it is determined that the function cannot be executed in the determining step, disabling the menu item corresponding to the function from being selected and displaying a reason why the menu item cannot be selected.

According to a second aspect of the present invention, a function executing apparatus displays menu items on a screen for, when a predetermined menu item is selected, executing a function corresponding to the selected menu item. The function executing apparatus includes an operation unit for displaying the menu items and performing a selection operation of the predetermined menu item; a state storing unit for storing the state of the apparatus; a determining unit for determining, based on the state of the apparatus stored in the state storing unit, whether a function corresponding to a menu item displayed on the screen can be executed; a disabling unit for, when it is determined by the determining unit that the function cannot be executed, disabling the menu item corresponding to the function from being selected; and a displaying control unit for, when it is determined by the determining unit that the function cannot be executed, displaying a reason why the menu item cannot be selected.

Thus, when a certain menu item cannot be selected because a function corresponding to the menu item cannot be executed, by displaying a message of the reason why the menu item cannot be selected, the user is informed of the reason. Accordingly, since the user knows the apparatus has not broken, the number of user complaints decreases.

Since messages are displayed using simple words such as "Full", "Empty", and "No Guidance", the user can understand a problem at a glance, which also helps the user find a countermeasure for the problem.

When the menu item cannot be selected, this menu item is displayed so as to be distinguished from the other menu items. In addition, the reason for which the menu item cannot be selected is also displayed in simple words. Accordingly, the user can understand the problem at a glance.

BRIEF DESCRIPTION OF THE DRAWINGS

FIG. 5 is a flowchart of displaying a "Confirm destination" screen;

FIG. 6 is a flowchart of displaying a "Select" screen;

DESCRIPTION OF THE PREFERRED EMBODIMENTS (A) Outline of Present Invention

Figure 1:
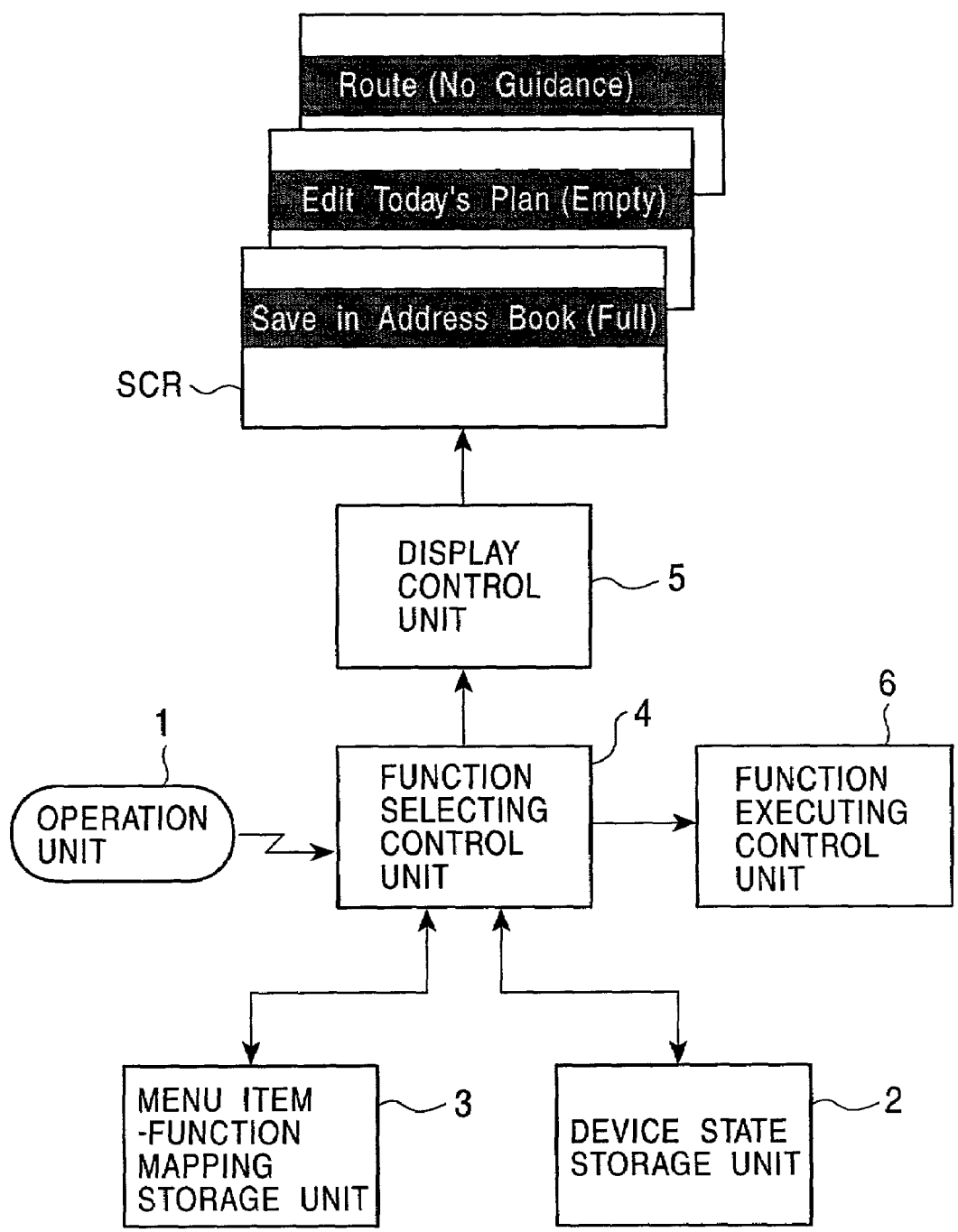
FIG. 1 is a block diagram showing the construction of a function executing apparatus according to the present invention.

A function executing apparatus according to the present invention displays menu items on a screen SCR and, when a predetermined menu item is selected, executes a function corresponding to the selected menu item. FIG. 1 shows the construction of the function executing apparatus. The function executing apparatus includes an operation unit 1, an apparatus state storage unit 2, a menu item-function mapping storage unit 3, a function selecting control unit 4, a display control unit 5, and a function executing control unit 6. The operation unit 1 (for example, a remote control unit) performs menu item displaying, selection of a predetermined menu item and the like. The apparatus state storage unit 2 stores the state of the function executing apparatus. The menu item-function mapping storage unit 3 stores the relationship between menu items and functions. The function selecting control unit 4 determines based on the apparatus state whether a function corresponding to a menu item displayed on the screen SCR can be executed and, when the function cannot be executed, disables the menu item corresponding to the function from being selected. The display control unit 5 displays the menu items on the screen SCR and, when a function cannot be executed, displays the menu item corresponding to the function in a distinguishably shaded manner along with the reason that the menu item cannot be selected. The function executing control unit 6 executes the function corresponding to the selected menu item.

When a function cannot be executed, as described above, the display control unit 5 displays the menu items so that a menu item corresponding to this function can be distinguished from the other menu items. In addition, the display control unit 5 displays a message on the field of the menu item for informing the user of the reason that the item cannot be selected. The message is as simple as "Empty", "Full", "No Guidance", or the like.

For example, when only a predetermined amount of data can be registered in a memory and the predetermined amount of data is already registered, the message "Full" is displayed on the field of the menu item for registering data, whereby the user is informed that the menu item cannot be selected.

When a predetermined function of reading data set in the memory is provided as a menu item, but no data is set in the memory, the message "Empty" is displayed on the field of the menu item corresponding to the function, whereby the user is informed that the menu item cannot be selected.

As another example, a navigation apparatus is provided with a function which can be executed exclusively during route guidance. When route guidance is not in progress, the message "No Guidance" is displayed on the field of the menu item corresponding to the function, whereby the user is informed that the menu item cannot be selected.

(B) Construction of Navigation Apparatus

Figure 2:
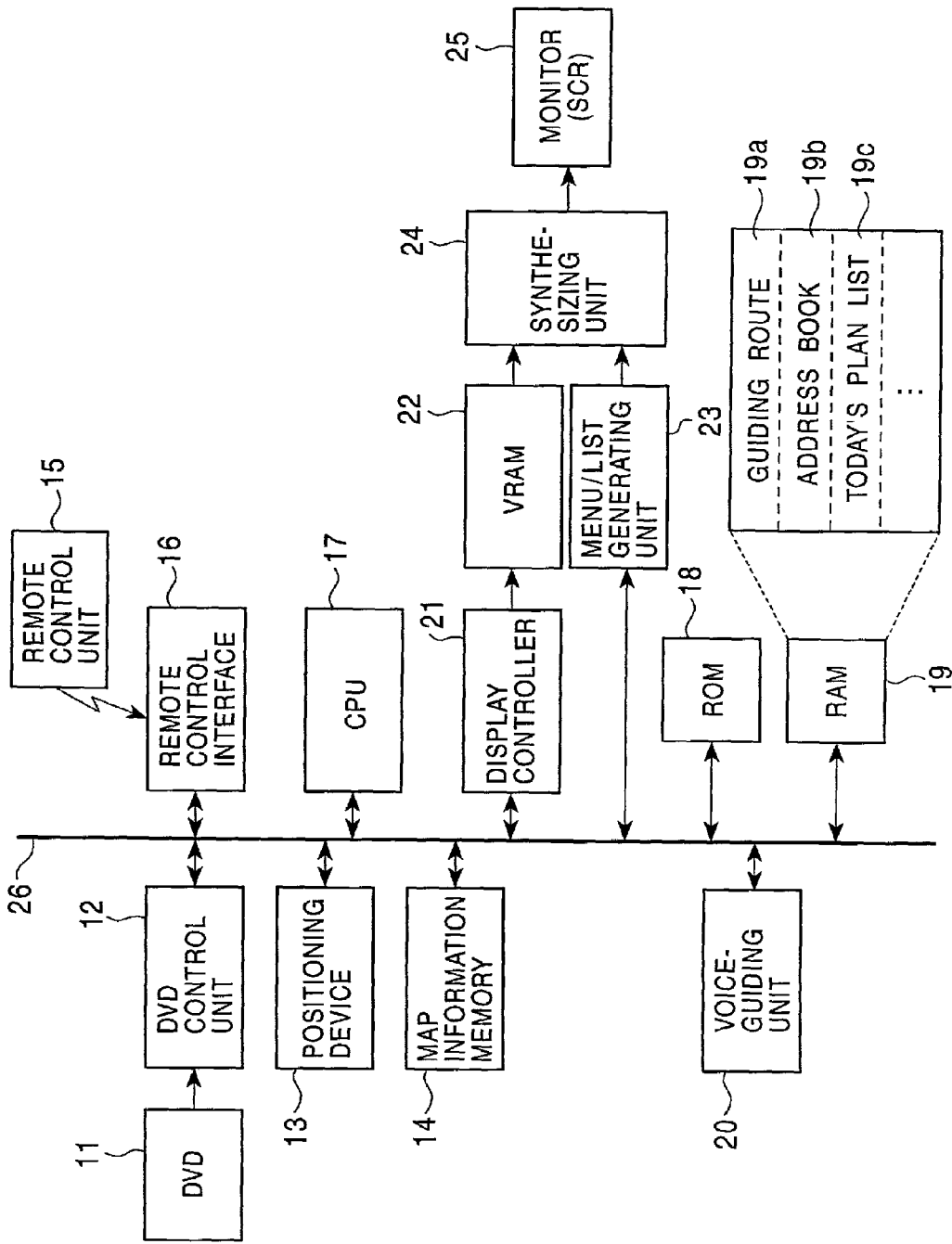
FIG. 2 is a block diagram showing the construction of a navigation apparatus.

FIG. 2 shows the construction of the navigation apparatus which serves as a function executing apparatus according to the present invention. In FIG. 2, the navigation apparatus includes a map storage medium 11 such as a DVD (Digital Versatile Disc) for storing map image data, a DVD controller 12 for controlling reading of map information from the map storage medium 11, a positioning device 13 for determining the current location of the vehicle, a map information memory 14 for storing map information read from the map storage medium 11, a remote control unit 15 for performing menu selection, map zooming, destination input, and the like, and a remote control interface 16. The positioning device 13 includes a speed sensor for determining the distance traveled, a gyroscope for detecting the direction of travel, a central processing unit (CPU) for computing the location of the vehicle, a global positioning system (GPS) receiver, and the like.

Figure 3:
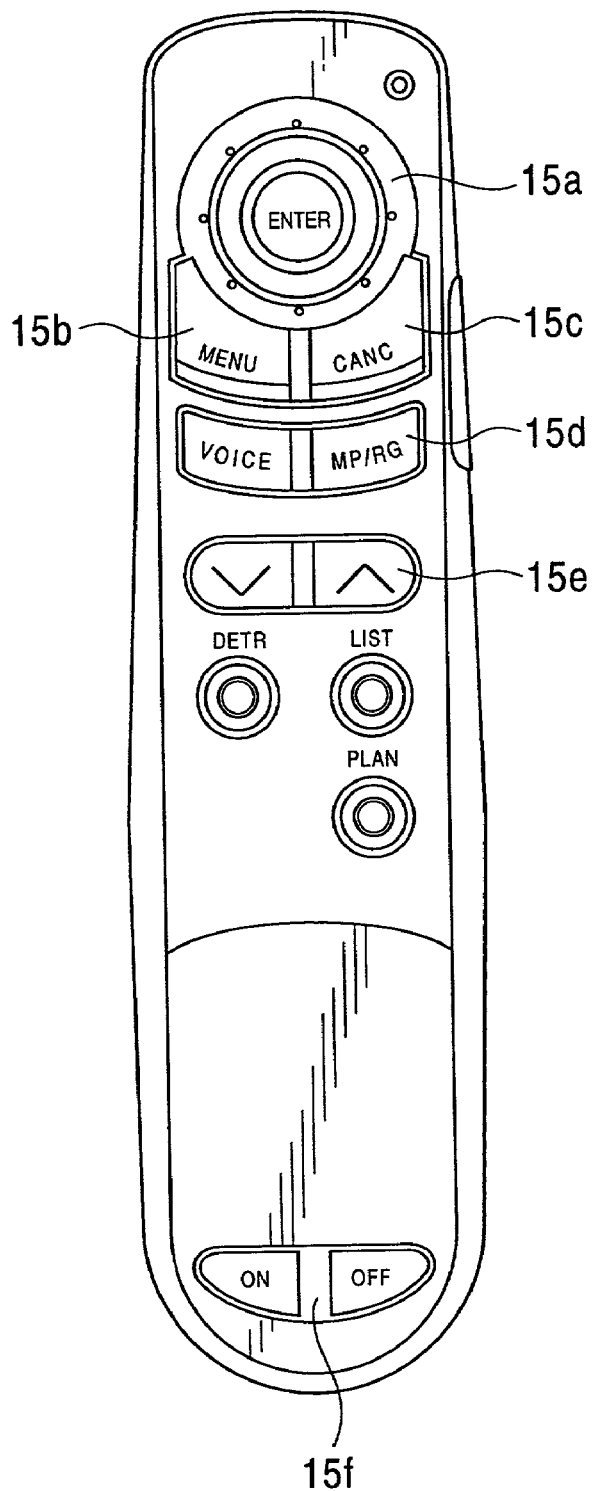
FIG. 3 is an illustration of a remote control unit.

As shown in FIG. 3, the remote control unit 15 includes a pointing-stick/enter key 15a, a menu key 15b, a cancel key 15c, an MP/RG key 15d, a zoom/scroll key 15e, and a monitor on/off key 15f. The pointing-stick/enter key 15a functions as a pointer which allows a cursor, a vehicle mark or the like to move in eight directions on the map image, or which allows a menu bar to move when the desired menu item is being selected. Furthermore, the pointing-stick/enter key 15a functions as the enter key for inputting the position of the cursor and for selecting and inputting the desired menu item. The menu key 15b is operated when a main menu is to be displayed. The cancel key 15c is operated to cancel the present screen display or to go back to the previous screen. The MP/RG key 15d is operated so as to switch over between a "MAP GUIDANCE MODE" and an "ARROW GUIDANCE MODE". The zoom/scroll key 15e is operated to perform zoom-in/zoom-out operations on the map image, shifting operation of a highlighted region in a list, and a scrolling operation in a variety of lists.

Referring back to FIG. 2, the navigation apparatus further includes a CPU 17, a ROM (read-only memory) 18, a RAM (random-access memory) 19, a voice-guiding unit 20, a display controller 21, a VRAM (video RAM) 22, a menu/list generating unit 23, a synthesizing unit 24, a monitor 25 (the screen SCR), and a bus 26. The CPU 17 controls the entire navigation system. The ROM 18 stores various types of control programs and static information such as menu items and the mapping relationship between the menu items and the functions. The RAM 19 includes a region 19a for storing a route to the destination, a region 19b for storing an address book, and a region 19c for storing a today's plan list. The voice-guiding unit 20 announces the direction of travel at an intersection. The display controller 21 generates the "MAP GUIDANCE" image or the "ARROW GUIDANCE" image based on the map information. The VRAM 22 stores images generated by the display controller 21. The menu/list generating unit 23 produces menu images and various types of list images.

(C) Example Displays of Menu Items According to Present Invention

Figure 4A:
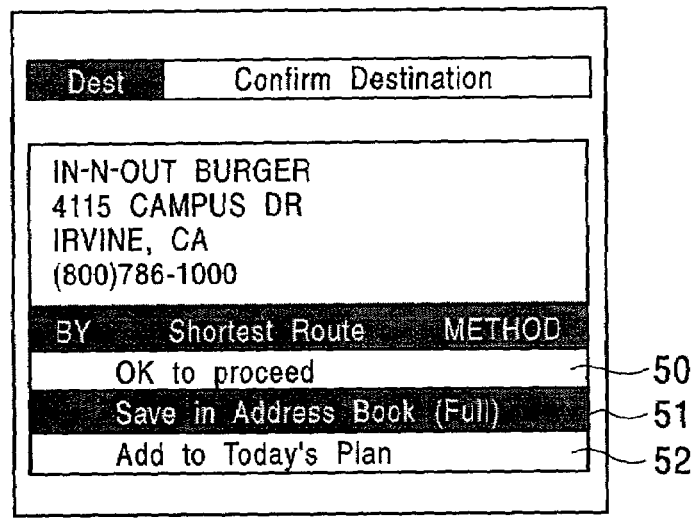
FIGS. 4A to 4C are examples of menu item display according to the present invention.
Figure 4B:
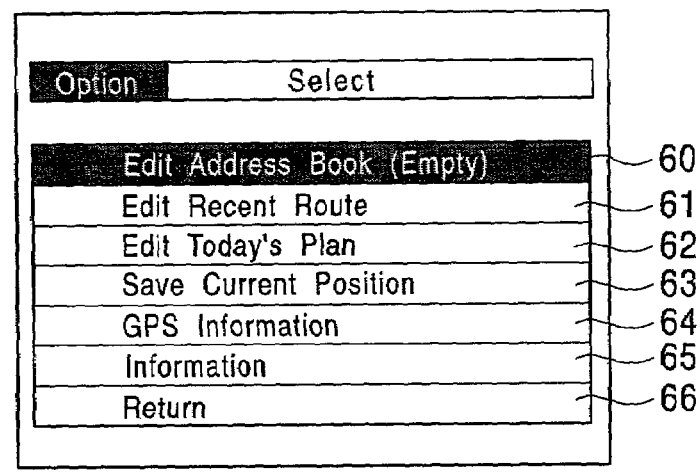
Figure 4C:
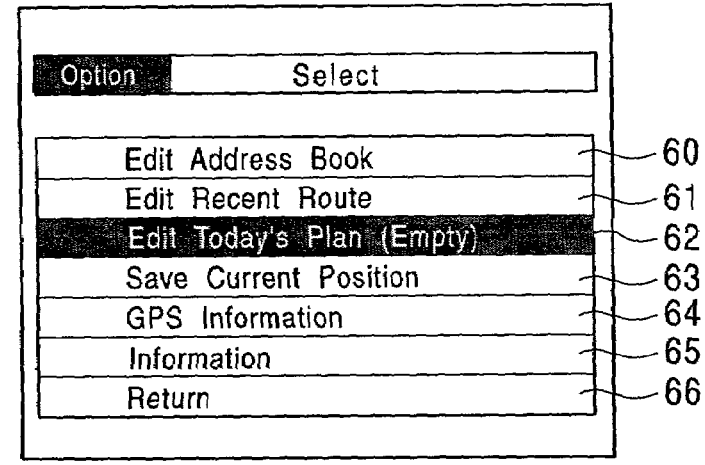

FIGS. 4A to 4C show example displays of menu items according to the present invention.

Due to the limitation of the number of addresses that can be registered in the address book storage region 19b, up to n addresses (for example, 90 addresses) can be registered. In other words, 91 or more addresses cannot be registered in the address book. Accordingly, on a "Confirm Destination" screen (FIG. 4A) that is displayed when it is attempted to register an address, when 90 addresses are already registered in the address book, a menu item 51 is shaded with gray, or the background color and the foreground color of the menu item 51 are reversed. In addition, a message "Save in Address Book (Full)" is displayed in the field of the menu item 51, whereby the user is informed that since the address book is full, address registration cannot be performed. For example, the background color and the foreground color of the menu item 51 are set to black and white, respectively, and the background color and the foreground color of the other menu items 50 and 52 are set to white and black, respectively, so that the menu item 51 can be distinguished from the other menu items. In addition, as described above, the message "Full" is displayed in the field of the menu item 51. Furthermore, even if the user attempts to move the menu bar to the shaded menu item 51, the menu bar skips over it so that it cannot be selected.

In order to change or delete an address registered in the address book, editing must be performed. However, when no address is registered, change or deletion of the address cannot be performed. Therefore, on a "Select" screen (FIG. 4B), when the address book is to be edited, a menu item 60 is shaded with gray, or the background color and the foreground color of the menu item 60 are reversed. In addition, a message "Edit Address Book (Empty)" is displayed in the field of the menu item 60, whereby the user is informed that since no address is registered in the address book, editing cannot be performed. For example, the background color and the foreground color of the menu item 60 are set to black and white, respectively, and the background color and the foreground color of the other menu items 61 to 66 are set to white and black, respectively, whereby the menu item 60 and the other menu items 61 to 66 can be distinguished. In addition, as described above, the message "Empty" is displayed in the field of the menu item 60. Furthermore, even if the user attempts to move the menu bar to the shaded menu item 60, the menu bar skips over it so that it cannot be selected.

In order to delete a destination registered in the today's plan list, editing must be performed. However, when no destination is registered, the destination cannot be deleted. Therefore, on the "Select" screen (FIG. 4C), when the today's plan list is to be edited, the menu item 62 is shaded with gray, or the background color and the foreground color of the menu item 62 are reversed. In addition, a message "Edit Today's Plan (Empty)" is displayed in the field of the menu item 62, whereby the user is informed that since no destination is registered in the today's plan list, editing cannot be performed. For example, the background color and the foreground color of the menu item 62 are set to black and white, respectively, and the background color and the foreground color of the other menu items 60, 61, and 63 to 66 are set to white and black, respectively, whereby the menu item 62 can be distinguished from the other menu items. In addition, as described above, the message "Empty" is displayed in the field of the menu item 62. Furthermore, even if the user attempts to move the menu bar to the shaded menu item 62, the menu bar skips over it so that it cannot be selected.

(D) Menu Item Display Control (a) "Display "Full" in Menu Item"

FIG. 5 shows an example of a menu item displaying method according to the first embodiment of the present invention in which "Full" is displayed in the field of the menu item.

Figure 11A:
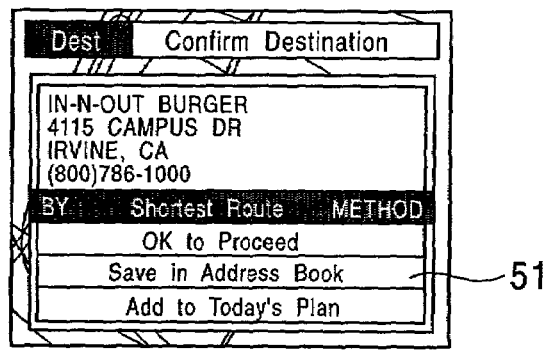
FIGS. 11A to 11D are illustrations for adding a location to the address book.
Figure 11B:
Figure 11C:
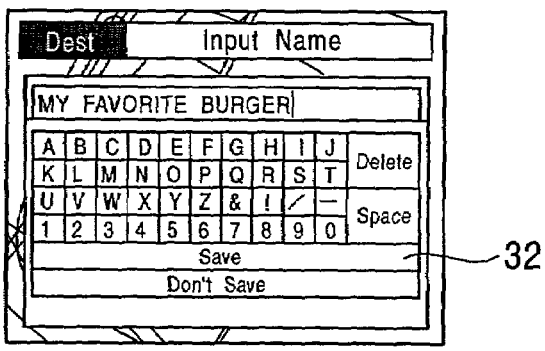
Figure 11D:
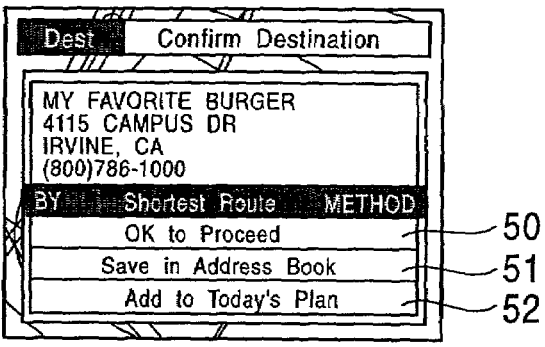
Figure 12A:
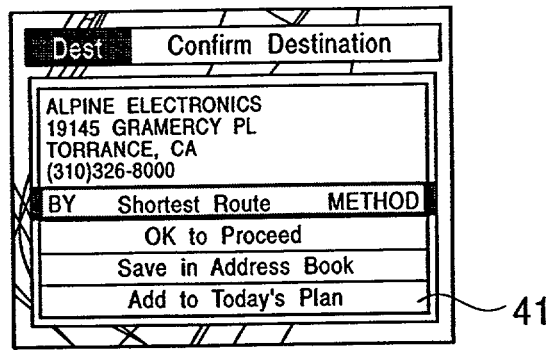
FIGS. 12A and 12B are illustrations for adding a location to a "Today's Plan"
Figure 12B:
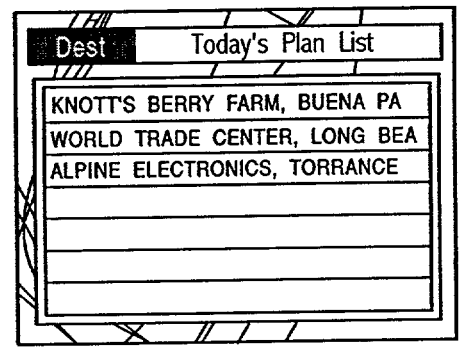
Figure 13A:
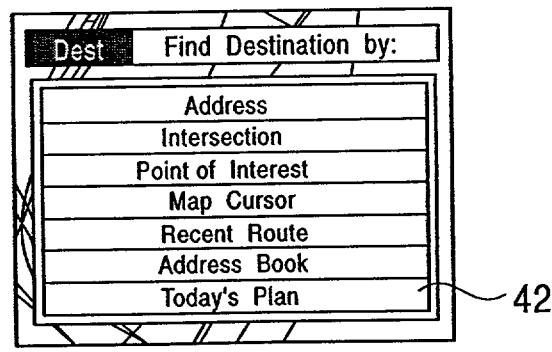
FIGS. 13A and 13B are illustrations for finding the shortest path by using the "Today's Plan"
Figure 13B:
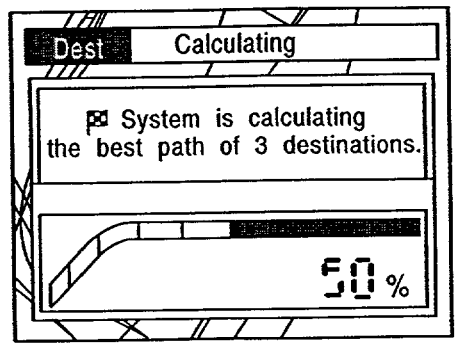

When a destination is input in an arbitrary manner (step 101), the CPU 17 determines whether the predetermined number of addresses is already registered by referring to the address book storage region 19b (step 102). When the number of addresses is less than the predetermined number, the "Confirm Destination" screen is displayed on which the menu item "Save in Address Book" 51 and other menu items 50 and 52 are displayed, as shown in FIG. 11D (step 103).

On the other hand, when the number of addresses is not less than the predetermined number, the menu item 51 is shaded with gray and the message "Save in Address Book (Full)" is displayed in the field of the menu item 51, as shown in FIG. 4A, whereby the user is informed that since the address book is full, address registration cannot be performed (step 104).

Subsequently, a menu selection operation can be performed so that the menu bar is moved to the menu item corresponding to a desired function. When the user attempts to select the shaded menu item 51 by causing the menu bar to move thereto, since the menu bar skips over it, the menu item 51 cannot be selected (step 105).

When a menu item corresponding to a desired function is selected (step 106), the CPU 17 executes the function corresponding to the selected menu item (step 107).

(b) "Display "Empty" in Menu Item"

FIG. 6 shows an example of a menu item displaying method according to the second embodiment of the present invention in which "Empty" is displayed in the menu item field.

Figure 14A:
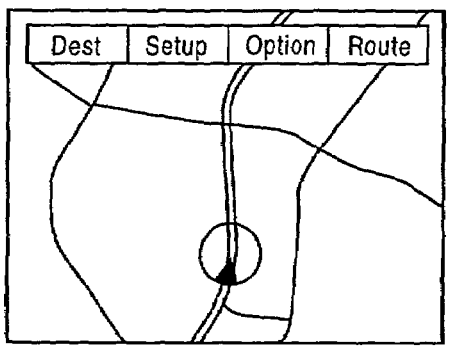
FIGS. 14A to 14F are illustrations for editing the address book.
Figure 14B:
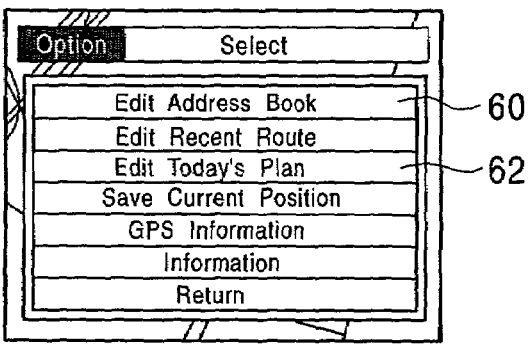
Figure 14C:
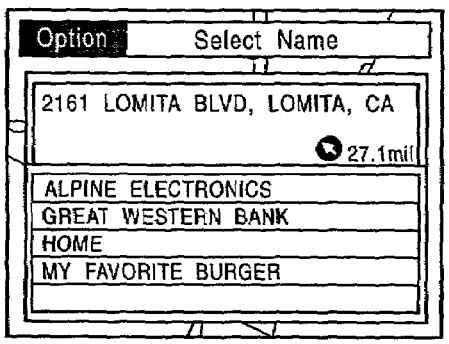
Figure 14D:
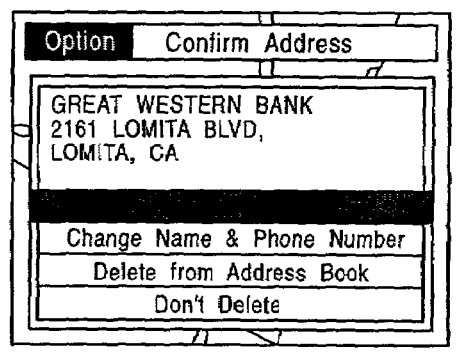
Figure 14E:
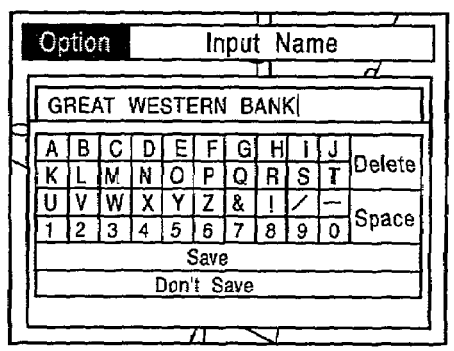
Figure 14F:
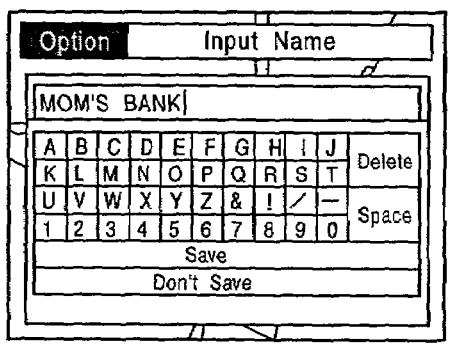

In order to change or delete various information which is already set, the main menu is displayed (see FIG. 14A). When a menu item "Option" is selected (step 201), the CPU 17 determines whether at least one address is registered in the address book (step 202). When an address is already registered, the "Select" screen shown in FIG. 14B is displayed on which the menu item "Edit Address Book" 60 and other menu items are displayed (step 203). On the other hand, when no address is registered, the menu item 60 is shaded with gray and the message "Edit Address Book (Empty)" is displayed in the field of the menu item 60, as shown in FIG. 4B, whereby the user is informed that since no address is registered, editing cannot be performed (step 204).

Figure 15A:
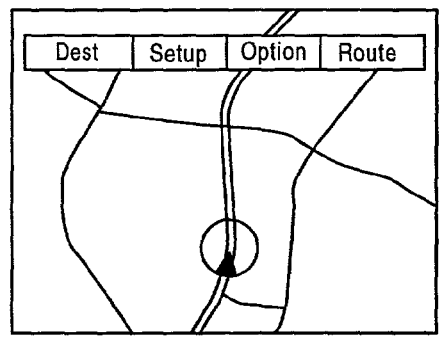
FIGS. 15A to 15D are illustrations for editing the "Today's Plan"
Figure 15B:
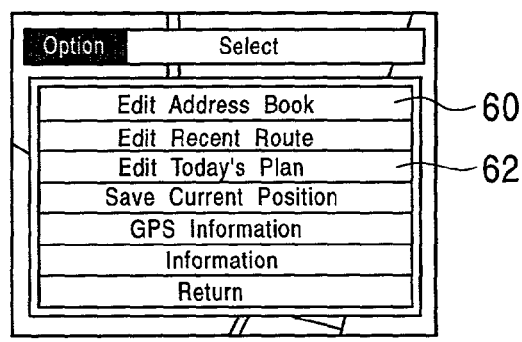
Figure 15C:
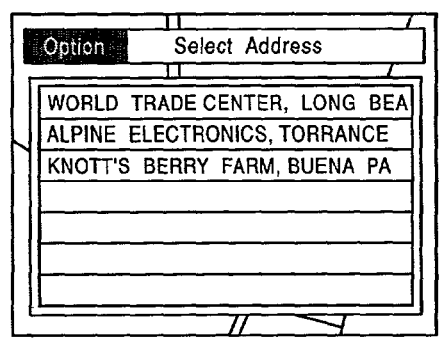
Figure 15D:
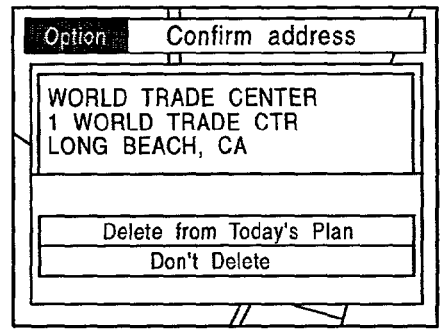
Figure 16A:
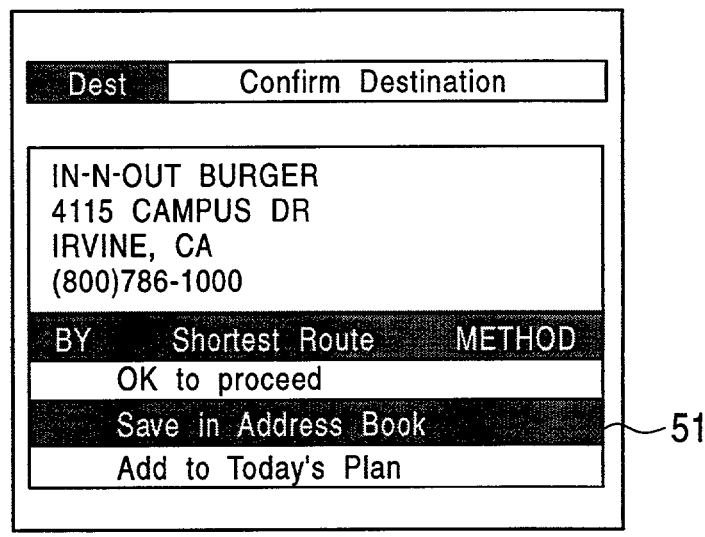
FIGS. 16A to 16C are illustrations of an inconvenience caused by a conventional menu item display.
Figure 16B:
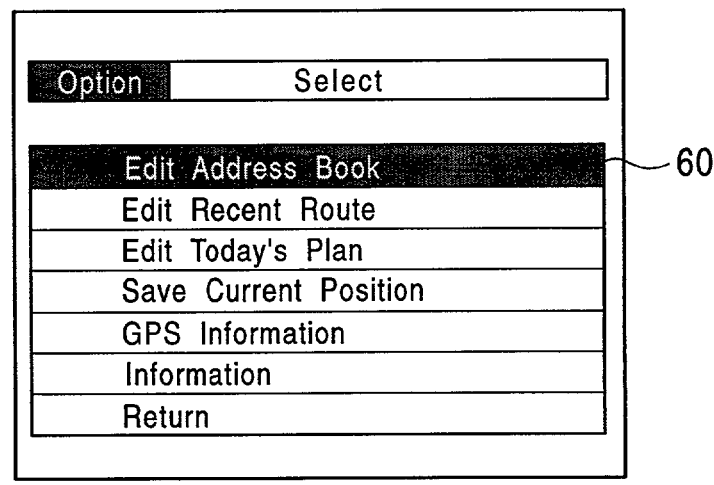
Figure 16C:
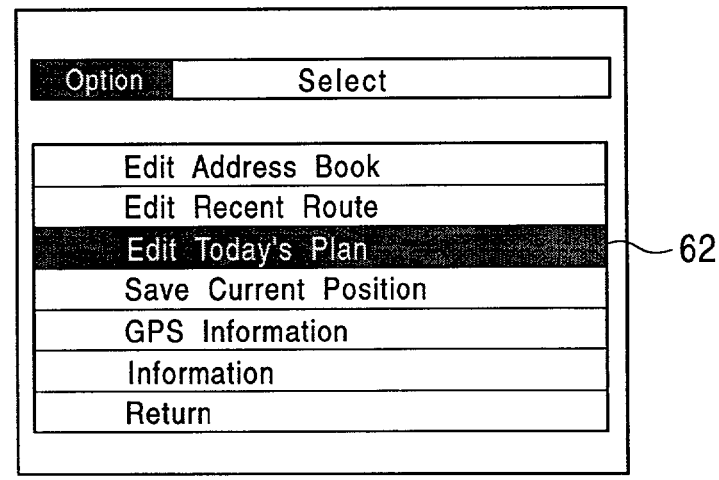

Subsequently, the CPU 17 determines whether at least one destination is registered in the today's plan list (step 205). When the destination is already registered, the menu item "Edit Today's Plan" 62 is displayed in the same manner as the other menu items (FIG. 15B) (step 206). On the other hand, when no destination is registered, the menu item 62 is shaded with gray and the message "Edit Today's Plan (Empty)" is displayed in the field of the menu item 62, whereby the user is informed that since no destination is registered in the today's plan list, editing cannot be performed (FIG. 4C) (step 207).

Menu selection is performed so that the menu bar is moved to a menu item corresponding to a desired function. When the user attempts to select the shaded menu item 60 or 62 by causing the menu bar to move thereto, since the menu bar skips over it, neither of the menu items 60 or 62 can be selected (step 208). Otherwise, by selecting the menu item corresponding to the desired function (step 209), the CPU 17 executes the function corresponding to the selected menu item (step 210).

(c) Example of Displaying Other Menu Items

While being guided along the route to the destination, the user may encounter the scene of an accident or road construction. When this happens, in order to detour around the accident or the construction, the user may reroute to an alternative route to the destination or may change the routing method to the destination.

Figure 7A:
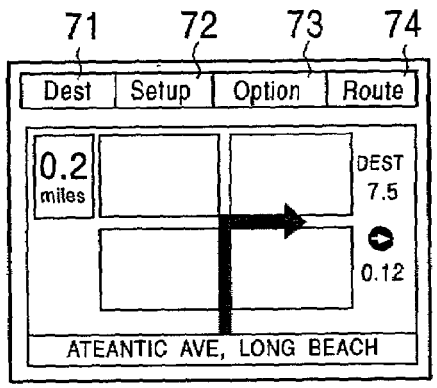
FIGS. 7A to 7E are example screens when a detour occurs.
Figure 7B:
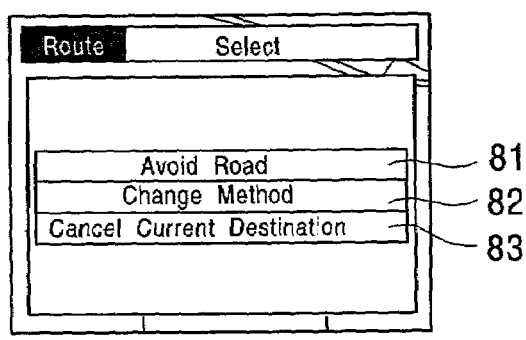
Figure 7C:
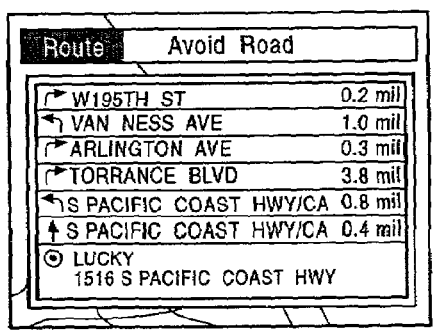
Figure 7D:
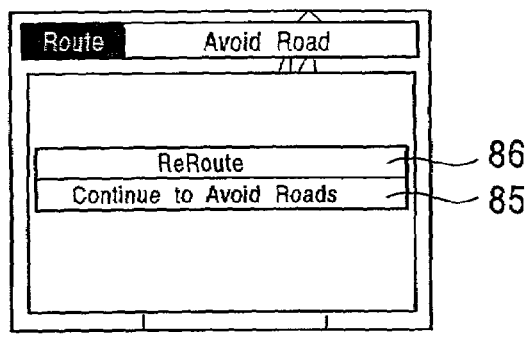
Figure 7E:
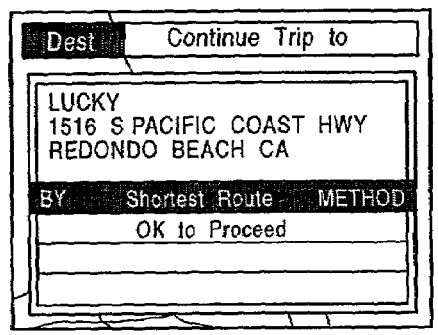

FIGS. 7A to 7E illustrate a case in which rerouting to the destination is performed in order to avoid a road along the route. The user presses a menu button to display the main menu and to select a menu item "Route" 74 from the main menu (FIG. 7A). The CPU 17 displays the "Select" screen for specifying a predetermined rerouting operation as shown in FIG. 7B. The "Select" screen includes a menu item "Avoid Road" 81 for avoiding a predetermined road, a menu item "Change Method" 82 for changing the routing method, and a menu item "Cancel Current Destination" 83 for canceling the destination. When the user selects the menu item "Avoid Road" 81, the CPU 17 displays an "Avoid Road" screen including a list of maneuver names and street names, as shown in FIG. 7C. The user selects the road to be avoided from this list and presses the enter key. The CPU 17 displays the "Avoid Road" screen shown in FIG. 7D. When there is another road to be avoided, the user selects a menu item "Continue to Avoid Roads" 85 to go back to the screen shown in FIG. 7C. When all roads to be avoided are input, the user selects a menu item "ReRoute" 86 to proceed to a "Continue Trip to" screen in FIG. 7E. When the user selects "OK to Proceed" in the "Continue Trip to" screen, the CPU 17 finds a new route to the destination which detours around the road to be avoided. Thus, the user resumes driving along the new route.

Figure 8:
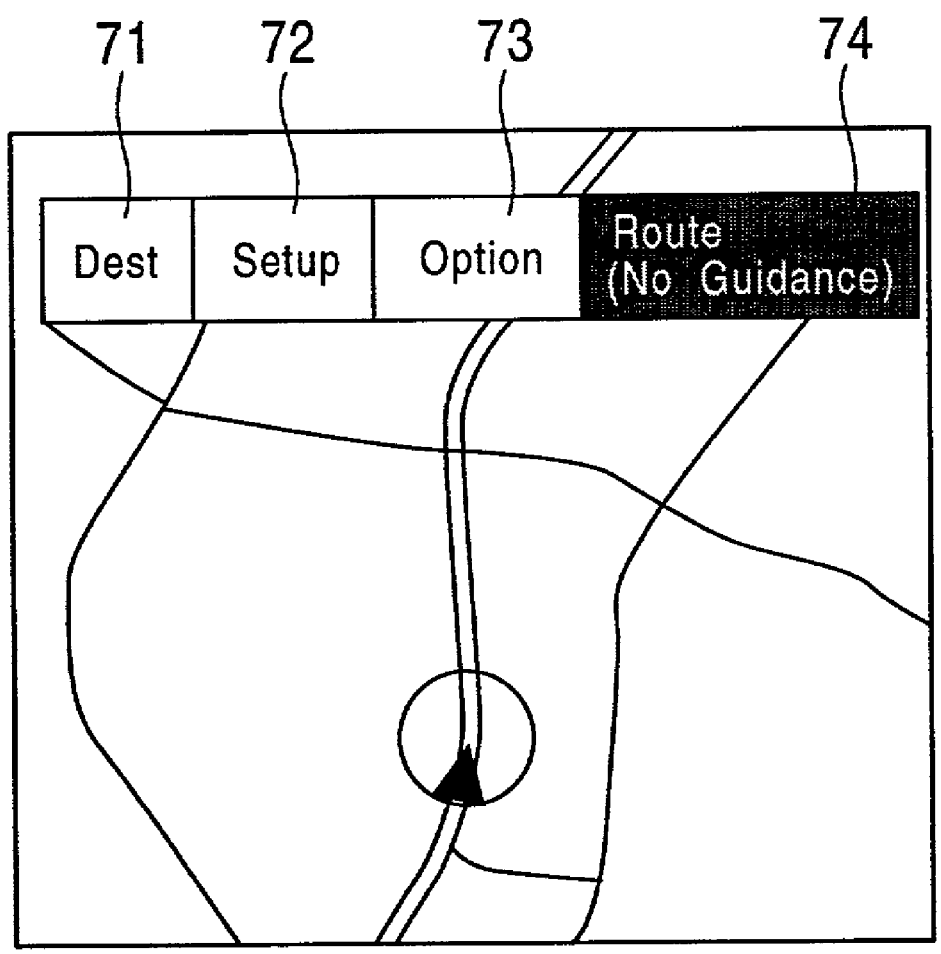
FIG. 8 is an example main menu screen when route guidance is not in progress.

Thus, in order to perform the route changing operation, the navigation apparatus is provided with a "Route" function. However, this function is executed exclusively while route guidance is in progress. Accordingly, in the present invention, when the main menu is displayed and when route guidance is not in progress, as shown in FIG. 8, the message "No Guidance" is displayed in the field of the menu item 74, whereby the user is informed that the menu item "Route" 74 cannot be selected.

Figure 9:
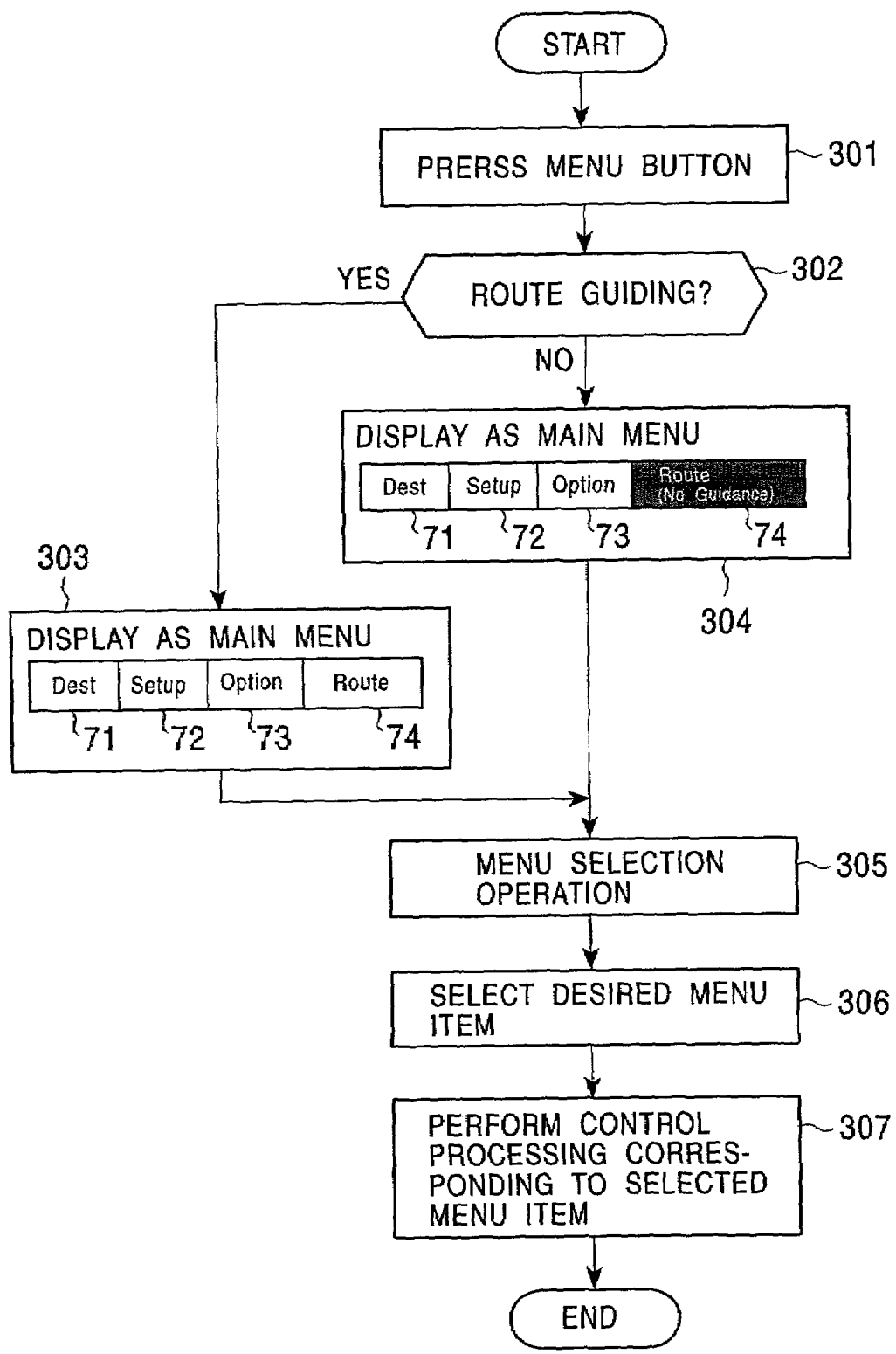
FIG. 9 is a flowchart for displaying the main menu screen.
Figure 10A:
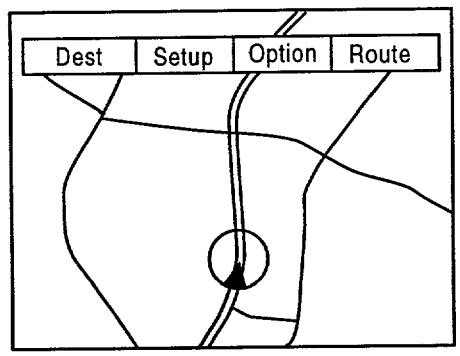
FIGS. 10A to 10D are illustrations for a destination input method using an address book.
Figure 10B:
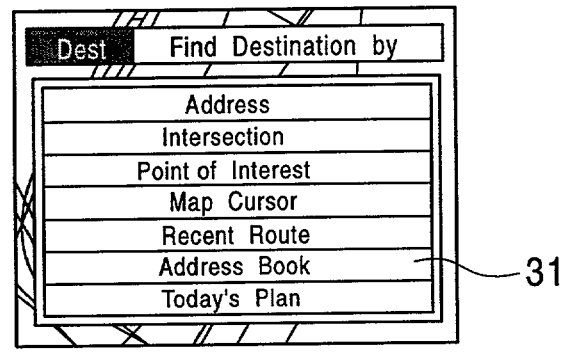
Figure 10C:
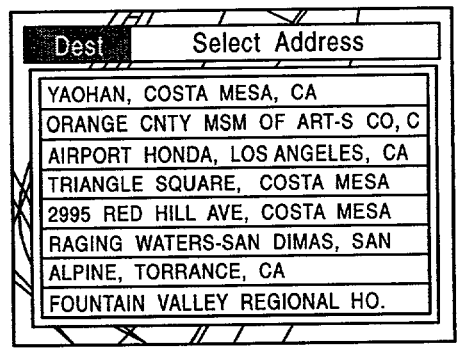
Figure 10D:
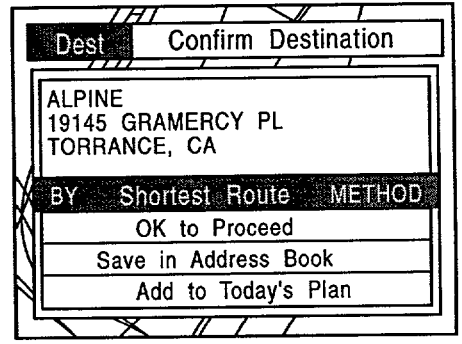

FIG. 9 shows an example of a menu item displaying method according to the third embodiment of the present invention in which "No Guidance" is displayed in the menu item field.

When the menu button is pressed (step 301), the CPU 17 determines whether route guidance is in progress (step 302). When route guidance is in progress, the main menu is displayed (FIG. 7A) (step 303). That is, the menu item "Route" 74 and the other menu items 71 to 73 are displayed. On the other hand, when route guidance is not in progress, the menu item "Route" 74 is shaded with gray and a message "Route (No Guidance)" is displayed in the field of the menu item 74, whereby the user is informed that since route guidance is not being performed, the route changing operation can not be performed (FIG. 8) (step 304).

Subsequently, the menu selection operation is performed. When the user attempts to select the shaded menu item 74 by causing the menu bar to move thereto, since the menu bar skips over it, it cannot be selected (step 305). Otherwise, when a desired menu item is selected (step 306), the CPU 17 executes the function corresponding to the selected menu item (step 307).

Thus, the reason why a menu item cannot be selected is described concisely rather than verbosely. In a rather rare case such as one in which it is attempted to register another address in the full address book, since the user finds it difficult to understand why the desired menu item is not available, a descriptive message may be displayed on the screen. Alternatively, a procedure for avoiding or solving this problem may be briefly displayed.

In the above examples, the number of reasons for disabling the menu item from being selected is one. However, when more than one reason is possible, these reasons should be briefly described for specifying the applicable one. For example, the following reasons can be applicable when the user cannot specify a waypoint, such as an interim destination or a route modification to take a detour. (1) If the ultimate destination is not specified, a location input by the user cannot be a waypoint. (2) If the waypoint list is full, another waypoint cannot be added thereto. (3) If a waypoint to be added is indicated using its longitude and latitude, the waypoint cannot be used for route guidance. When there is a plurality of reasons for disabling the menu item from being selected, even an experienced user may be confused. Once the reason is specified, the user can recognize a cause and know how to deal with it. For example, when the waypoint cannot be specified due to reason (1), the ultimate destination should be input first. When the waypoint cannot be specified due to reason (2), unimportant waypoints should be deleted from the list. When the waypoint cannot be specified due to reason (3), the waypoint to be added should instead be specified by the street address in the vicinity of the desired location, rather than its longitude and latitude. Thus, when a plurality of reasons are possible, a brief message is displayed so that the actual reason is explained.

In the above examples, when a certain menu item cannot be selected because a function corresponding to the menu item cannot be executed, a message is displayed identifying the reason why the menu cannot be selected. Instead of displaying the reason, a procedure to avoid or solve the problem may be displayed using a brief message, as long as the field of the menu item has a room for displaying this message.

Although, in the present examples, the invention is applied to the navigation apparatus, the invention may be applied to an electronic dictionary, a portable phone, a clock-timer display of a video cassette recorder, a menu screen on a personal computer display, or the like.

As many widely different embodiments of the present invention can be made without departing from the spirit and scope thereof, it is to be understood that the invention is not limited to the specific embodiments thereof except as defined in the appended claims.

What is claimed is:

1. A menu item displaying method for a vehicle navigation apparatus in which menu items are displayed on a screen and when a predetermined menu item is selected by a user, a function corresponding to the selected menu item is executed, said menu item displaying method comprising:
determining whether a navigation apparatus function corresponding to a menu item displayed on the screen can be executed; and
if it is determined that said function cannot be executed, disabling said menu item corresponding to said function from being selected and displaying a reason why said menu item cannot be selected;
wherein said navigation apparatus function comprises a user registering navigation related data in a memory in which only a predetermined amount of data can be registered, and when said predetermined amount of data is already registered in said memory, a message indicating that said menu item cannot be selected due to memory limitations is displayed in the field of said menu item for registering data.

2. A menu item displaying method according to claim 1, wherein a concise message indicating said reason is displayed in a field of said menu item.

3. A menu item displaying method according to one of claims 1 and 2, wherein said disabled menu item is displayed so as to be distinguished from non-disabled menu items.

4. A menu item displaying method according to one of claims 1 and 2, wherein a further function comprises reading data that is set in a memory to have a predetermined function executed, and when no data is set in said memory, a message indicating that said menu item cannot be selected due to no data being set in said memory is displayed in the field of said menu item.

5. A menu item displaying method according to one of claims 1 and 2, wherein:
in the field of said menu item corresponding to a function which can be executed only while said navigation apparatus performs route guiding, when said route guidance is not in progress, a message indicating that said menu item cannot be selected due to the fact that route guiding is not in progress is displayed.

6. A vehicle navigation apparatus for displaying menu items on a screen and, when a predetermined menu item is selected, for executing a function corresponding to the selected menu item, said navigation apparatus comprising:
an operation unit for displaying the menu items and performing a selection operation of said predetermined menu item;
a state storing unit for storing the state of the navigation apparatus;
a determining unit for determining, based on the state of the navigation apparatus stored in said state storing unit, whether a function corresponding to a menu item displayed on the screen can be executed;
a disabling unit for disabling said menu item corresponding to said function from being selected if it is determined by said determining unit that said function cannot be executed; and
a displaying control unit for displaying a reason why said menu item cannot be selected when it is determined by said determining unit that said function cannot be executed;
wherein, in the field of said menu item corresponding to a function which can be executed only while said navigation apparatus performs route guiding, when said route guidance is not in progress, a message indicating that said menu item cannot be selected due to the fact that route guiding is not in progress is displayed.

7. A vehicle navigation apparatus according to claim 6, wherein said display control unit displays, in a field of said menu item, a concise message which indicates the reason why said menu item cannot be selected.

8. A menu item displaying method for a vehicle navigation apparatus in which menu items are displayed on a screen and when a predetermined menu item is selected by a user, a function corresponding to the selected menu item is executed, said menu item displaying method comprising:
- determining whether a navigation apparatus function corresponding to a menu item displayed on the screen can be executed; and
- if it is determined that said function cannot be executed, disabling said menu item corresponding to said function from being selected and displaying a reason why said menu item cannot be selected;
- wherein said navigation apparatus function comprises reading navigation related data that is set by a user in a memory to have a predetermined function executed, and when no data is set in said memory, a message indicating that said menu item cannot be selected due to no data being set in said memory is displayed in the field of said menu item.

9. A menu item displaying method according to claim 8, wherein a concise message indicating said reason is displayed in a field of said menu item.

10. A menu item displaying method according to claim 8, wherein said disabled menu item is displayed so as to be distinguished from non-disabled menu items.

11. A menu item displaying method according to claim 8, wherein:
- in the field of said menu item corresponding to a function which can be executed only while said navigation apparatus performs route guiding, when said route guidance is not in progress, a message indicating that said menu item cannot be selected due to the fact that route guiding is not in progress is displayed.

* * * * *